Aug. 6, 1935. C. R. PEAKER ET AL 2,010,104

PROCESS AND APPARATUS FOR MANUFACTURING RUBBER ARTICLES

Filed Sept. 23, 1932

INVENTORS
EARDLEY HAZELL
CHARLES R. PEAKER
BY
ATTORNEY

Patented Aug. 6, 1935

2,010,104

UNITED STATES PATENT OFFICE 2,010,104

PROCESS AND APPARATUS FOR MANUFACTURING RUBBER ARTICLES

Charles R. Peaker, Passaic, N. J., and Eardley Hazell, New York, N. Y., assignors, by mesne assignments, to United States Rubber Company, New York, N. Y., a corporation of New Jersey Application September 23, 1932, Serial No. 634,534

16 Claims. (Cl. 204—1)

This invention relates to the manufacture of articles from aqueous dispersions of rubber by deposition on forms and to the washing of such articles by electro-osmosis without removal from the forms.

It is known that rubber articles may be made on a form by depositing a film of aqueous dispersion of rubber, such as rubber latex, on the form and drying the film. Rubber articles have also been made on a form by dipping the form into an aqueous dispersion of rubber and then dipping the form with the adhering dispersion on the surface into a coagulant such as acid, which coagulates on the surface of the form a deposit of rubber which may be dried and vulcanized or otherwise treated. In practice, several successive coatings are generally applied on non-porous forms by the dipping and coagulating method. It is also known to deposit a film of aqueous dispersion of rubber on the surface of a porous form wherein the aqueous portion of the dispersion is withdrawn through the form leaving a thickened dispersion on the surface which may be dried or coagulated and thus give a thicker film or surface of the article to be produced. In some cases a vacuum is applied to the interior of the porous form and a continual withdrawal of the aqueous portion of the dispersion through the form produces a film of thickened latex on the surface to any desired depth, which may be dried or otherwise treated.

By the dipping of forms and the like in aqueous dispersions of rubber, such as latex or artificial dispersions, articles are produced containing numerous water soluble constituents chiefly in the form of hydrophilic colloidal materials such as soaps, and proteins, and water soluble inorganic salts. Due to the inclusion of these water soluble constituents in the final product, the article is of inferior electrical insulating value. It has been recognized that removal of these water soluble constituents will increase the electrical insulation properties to a great extent. This is of prime importance in making rubber articles on forms such as electrician's gloves, and other products where a high dielectric strength is desirable.

In an application of Eardley Hazell, No. 504,538, filed December 24, 1930, now Patent No. 1,931,002, issued October 17, 1933, there is disclosed a method of removing water soluble constituents from a deposited article by electro-osmosis.

One method disclosed in that application is the deposition on a hollow porous form of a rubber film from latex or other aqueous dispersion of rubber and the insertion of the form with the deposited film on it into water containing a small amount of electrolyte. The inside of the form is also filled with electrolyte and electrodes are placed inside and outside the form and a current made to pass between the electrodes through the porous form and the deposited film on the surface of it. The film is thus made the septum or membrane in an electro-osmotic cell and by virtue of passage of the current through the rubber deposit, water will flow through the film from the anode to the cathode thereby washing the water solubles out of the film. Water may be supplied to the anode portion of the electrolyte and withdrawn from the cathode portion to which it flows. The electrode inside the form is preferably made the cathode but it may be made the anode and the water washed from the inside of the form to the outside if desired. It is not necessary to insert an electrode into a hollow porous form for the washing operation after the deposition and coagulation or drying if the form is made with a liner of perforated metal and a porous filtering medium superposed on the surface of the metal liner. In such a case, the rubber may be deposited on the porous form by dipping into an aqueous dispersion and drying or by dipping and coagulating, and the form together with the adhering film placed in an electrolyte and a current passed through the film using the metal liner as one electrode preferably the cathode, and the container itself, if desired, as the other electrode.

By the method described in the application of Eardley Hazell, No. 504,538, if it is desired to form the article from an aqueous dispersion on a non-porous form as for example by dipping and coagulating, it would be necessary before washing the deposited article by electro-osmosis to remove it from the non-porous form and transfer it either to a porous form or a support for the washing treatment.

An object of this invention is to provide a non-porous form on which an article may be deposited from an aqueous dispersion of rubber and washed by electro-osmosis without removal from the form.

It is also an object of the invention to provide a method of washing by electro-osmosis a film or article deposited on a non-porous form without removal from the form.

Other objects and advantages will be apparent from the following description.

The accompanying drawing illustrates certain present preferred forms of apparatus for practicing the invention, in which.

Figure 1:
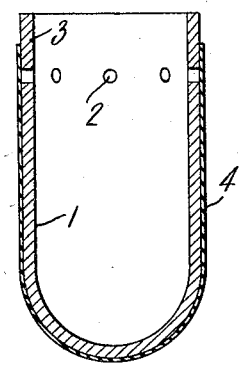
Figure 1 illustrates a non-porous form of simple design on which a deposited coating may be washed by electro-osmosis.

Referring to Fig. 1, 1 represents a hollow circular metal form with a series of perforations 2 slightly below the top 3 forming a series of passages from the outer surface of the form to the interior hollow portion. The structure of the form may be of any desired metal, but is preferably a corrosion resistant metal such as stainless steel, chromium plated aluminum, gold plated aluminum, or other plated metal or alloy. The form 1, as shown in Fig. 1, may be dipped into an aqueous dispersion of rubber and the adhered coating 4 may be coagulated by drying or dipping into a coagulant in a manner well known in the art. A number of coatings may be deposited on one another as is well known in the art. After a sufficient thickness of the deposited rubber has been built up on the form as by alternate dipping in a latex composition and a coagulant, the rubber film is dried.

Figure 2:
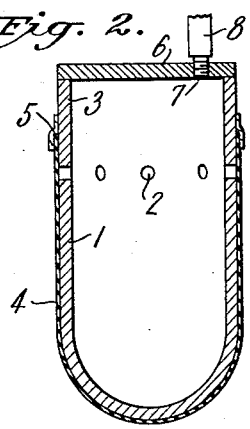
Fig. 2 illustrates the form of Fig. 1 with the film deposited on it and one means for holding the film onto the form during the washing.
Figure 3:
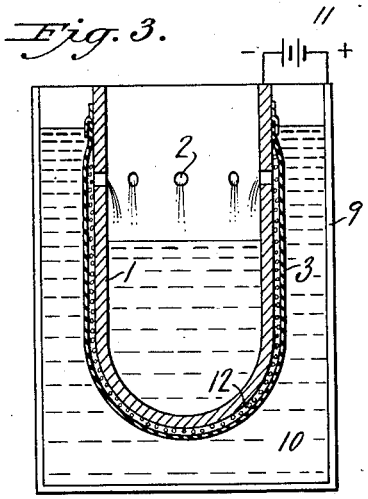
Fig. 3 shows in more or less diagrammatic form an apparatus for washing the film deposited on the form as shown in Fig. 2 by electro-osmosis.

It is desired to loosen the dried film from the form in the zone including the passages communicating with the interior of the form, in order to facilitate the subsequent withdrawal of water through the passages during the washing of the deposited film, but before this is done, the film is preferably sealed to the top of the form by suitable means, one example of which may be by wrapping a band 5 of fabric or other material around the top of the film as shown in Fig. 2. In practice a few pounds of air pressure is then applied to the interior of the form causing film 4 to balloon slightly and pull away from the form in the zone adjacent to the openings of the passages 2. This may be done by placing a closely fitting lid 6 containing a nozzle 7 fitted to a tubing 8 connected to a source of air pressure (not shown) over the top of the form and applying a slight air pressure to the interior of the form. The air pressure is then released and the lid 6 removed. The dry film is now ready to be washed and the form and film as shown in Fig. 2 are placed in a washing apparatus, as shown in Fig. 3, in which 9 represents a container, which may be of metal, for holding water containing a small amount of electrolyte shown at 10. The container 9 and the metal form 1 may be made electrodes by connecting them with a source of current 11 preferably making the form the cathode. The current passing through the wash solution in the tank or container 9 from the tank to the metal form 1 will cause the water from the container 9 to flow through the rubber film at the same time evolving gas on the surface of the form. The electro-osmotic flow of water through the rubber film effects a loosening from the form of the remaining portions of the film which were not previously loosened by air pressure, except the upper portion where it is held closely to the form by the band 5. Owing to the fact that hydrophilic colloids, such as soaps and proteins are carried through the film by the wash liquid, a stable foam 12 is produced between the surface of the form and the rubber film. Under the slight pressure developed by the generation of gases and by the flow of water through the film, this foam passes through the perforations 2 into the interior of the hollow form, from which it may be removed, as desired, by a siphoning operation or the like. An effectively unidirectional current of from 15 to 30 volts is preferred although a voltage from 10 to 110 volts may be used, the higher voltages, however, tending to give rise to blisters. A washing under 15 to 20 volts for two hours has been found very effective. The electrolyte should be chosen to serve the dual functions of providing a conducting path for the electric current, and to increase the rate of the osmotic flow of water in the desired direction. Hydroxyl ions and/or polyvalent anions are satisfactory while acids and polyvalent cations are to be avoided since they depress or may entirely prevent the osmotic flow in the desired direction, and may even reverse the direction of such flow if present in sufficient amount. A further desirable property of the electrolyte is complete volatility at the temperature employed in drying or vulcanizing the rubber. Ammonium hydroxide in a 2.5 to 5 percent solution is very satisfactory as an electrolyte.

Figure 4:
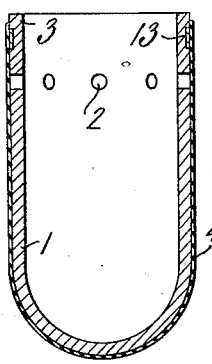
Fig. 4 illustrates a modification of the form shown in Fig. 1.

In the embodiment shown in Figs. 1 to 3, the film after deposition is sealed at the top of the form by means of a band or fabric 5. In Fig. 4 is shown another means for sealing the top of the film 4 wherein there is a band or insert 13 around the top 3 of the form 1 of a material to which the film of rubber 4 will more strongly adhere and from which band or insert the corresponding portion of the film will not be separated by the bubbles during the washing as shown in Fig. 3 at 12, or by a previous ballooning of the film as by the application of pressure to the interior of the form by means of top 6 as shown in Fig. 2 prior to the electro-osmotic washing.

Figure 5:
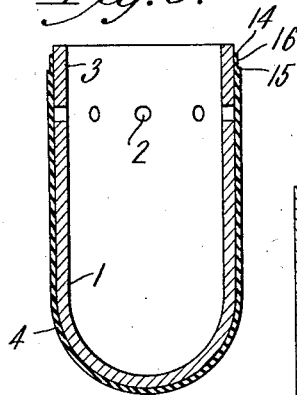
Fig. 5 represents the form of Fig. 1 with another means for holding the film onto the form during washing.

Fig. 5 illustrates a method of sealing the top of the rubber film which is applicable when the film is deposited by a dipping and coagulating method. In this case the first dip of the form into the artificial dispersion of rubber is made to take place up to a point very near the top of the form, as shown at 14. When the film is coagulated, the form with the latex adhering to the surface is dipped into a coagulant only up to a point 15 somewhat below the point 14. When such a film is dried prior to washing by electro-osmosis a narrow layer 16 at the top of the form which has been dried without a prior treatment with coagulant will provide a tight seal with the metal surface. In this way, by dipping and drying a narrow portion of the film, such portion is made to adhere to the form and seal the rubber deposit. It is in such a case, not necessary to additionally seal the top of the film, as shown at 5 in Fig. 2, nor to provide a modified form with an insert in the surface above the passages 2 to which the film will adhere, as shown at 13 in Fig. 4.

Figure 6:
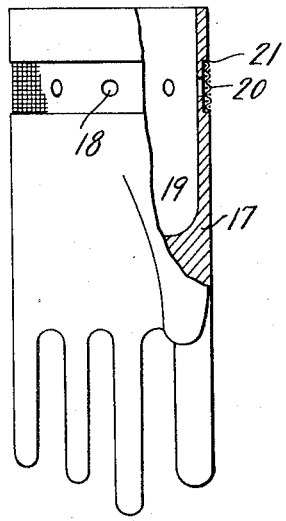
Fig. 6 illustrates a non-porous glove form on which a deposited coating may be washed by electro-osmosis.

Figure 6 illustrates a glove form by which electricians' and/or surgeons' gloves, for example, may be manufactured. The form 17 is preferably made of metal and is provided around the wrist portion with a series of passages 18 from the outer surface of the form to a hollow wrist section 19 which may be of any desired depth, or which may, if desired, constitute the only hollow portion of the form. The hollow section only serves as a reservoir to receive the water flowing into it through the passages 18.

In the illustrations shown in Figures 1 to 5, the form is dipped into latex above the passages 2 in order to form a film on the outside of the form which will cover the passages. It is necessary to in some way protect the dispersion into which the form is dipped from itself flowing through these passages and into the interior of the form. This may be done by temporarily covering the surface of the passages with a water soluble material, as by coating with molten cane sugar, or by plugging with gelatin, which may be readily washed out or broken away to allow free passage of the wash water to the interior of the form, before the electro-osmotic washing is begun. This temporary coating of the passages during the deposition of the film may be omitted if, as shown in Fig. 6, a screen 20 is placed over the passages as by insertion in a groove 21. This screen may be fine enough to prevent any substantial leakage of the aqueous dispersion into the form at least until the film or the first coating of the deposit has been coagulated on the surface. However, in order to assure that no material leakage of the dispersion through the passages will take place, it is desirable to apply to the screen before dipping into the latex or artificial dispersion, a coagulant, in which case when the form is dipped into the dispersion a coagulated band will immediately form adjacent the screen 20 and prevent the liquid portion of the dispersion from seeping through the passages. Also in this manner a thickened portion or bead will be formed on that part of the article adjacent the section of the form which contains the coagulant.

Figure 7:
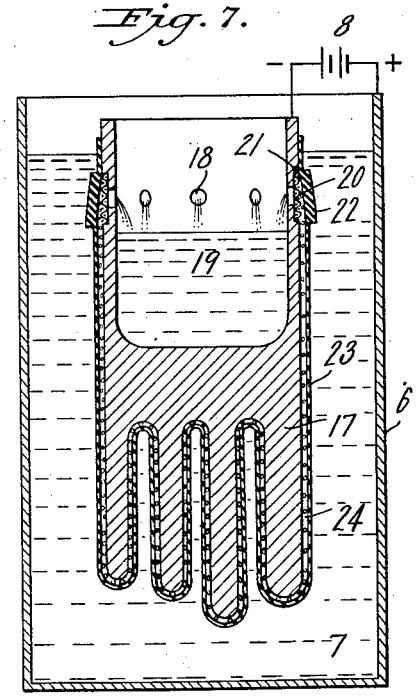
Fig. 7 is a more or less diagrammatic illustration of an apparatus for washing a film deposited on the form shown in Fig. 6.

Fig. 7 shows the washing of a glove deposited on the form of Fig. 6. As in Fig. 3, the form, in this case a glove form 17, together with the film 23 on it is immersed preferably in a metal container 6 containing wash water 7 with a small amount of electrolyte, and a source of current 8 is connected between the container 6 and form preferably making the form the cathode so that the water will travel from the container through the film and into the interior of the form, as described above with the simpler type of form shown in Fig. 3. In Fig. 7 the top of the glove has been sealed to the top of the form by the method disclosed in Fig. 5, wherein the form was dipped into a coagulant subsequent to dipping in the rubber dispersion to a lesser height, thereby forming an adhered strip of film around the top of the form on drying. In the preparation of the film the screen 20 was saturated with a coagulant before first dipping into the dispersion and in this manner a thicker portion was produced adjacent the screen as shown at 22. This method of forming a thickened portion or bead on a deposited rubber article is applicable to any dipping process and is not necessarily confined to a dipping on a form which is afterwards used in the electro-osmotic washing of the deposited film. In the washing shown in Fig. 8, as in the washing shown in Fig. 3, the wash water travels through the film at the same time evolving gas at the surface of the form. Hydrophilic colloids, such as soaps and proteins, are carried through the film by the wash water and a stable foam 24 is produced between the surface of the form 17 and the film 23, and under the slight pressure developed the foam rises and passes through the screen 20 and passages 18 into the hollow wrist portion 19 from whence the wash water may be removed in any desired manner, for example as by siphoning.

In an example where the screen 20 was first saturated with coagulant and the form dipped into a compounded latex to a point about half an inch above the top of the screen, it was found that the thickness of the coagulated film opposite the screen was .055 inch; while above and below this region the thickness of the film was .043 inch. As has been stated, this method of applying a coagulant to the selected portions of a form and thereafter dipping the entire form in latex or other aqueous dispersions of rubber to form a thickened portion opposite those sections of the form to which the coagulant was applied, may be used generally in dipping and drying or dipping and coagulating processes.

In operation the form is dipped in a rubber dispersion and the film dried or coagulated, repeating the process a number of times if desired, in a manner well known in the art to obtain a film of the desired thickness, and finally drying the finished coating. The top of the film above the passages from the surface of the form to the interior is made to adhere to and seal the film around the top of the form. If necessary, all but the sealed portion of the film is loosened from the form preferably by the application of air pressure to the interior of the form. The form is then submerged in a wash water containing a small amount of electrolyte, and is connected with a source of current, preferably making the form the cathode and the container the anode, and a current is passed through until the desired washing of the film has been completed. The wash water entering the interior of the form may be removed as by siphoning or like operation. The form, together with the washed film, may now be removed from the container and the film dried, vulcanized if desired and stripped from the form.

In the present procedure described above and illustrated in Figures 6 and 7, the coagulant is held in the meshes of the screen 20 by virtue of its surface tension. The screen, however, may be coated with a material capable of holding the coagulant, for example gelatin which may later be washed out or otherwise removed. The screen may be omitted and the groove 19 coated with a water soluble material, such as molten cane sugar or with a film of gelatin which can be readily washed out or broken before the washing to allow free passage of the wash water to the interior of the form, as described above in relation to the form shown in Figures 1 to 5.

The forms 1 in Figures 1 to 5 and the forms 17 in Figs. 6 and 7 have been shown as hollow metal forms or metal forms with a hollowed out section. The forms in practice need not be entirely of electrical conducting material but it is sufficient if only the surface is of metal or other conducting material or is metallized, and such surface may be reinforced with non-conducting material if desired.

Various other modifications will be apparent to persons skilled in the art and it is understood that I do not intend to limit myself to the specific improvements as described above except as indicated in the appended claims.

Having thus described our invention, what we claim and desire to protect by Letters Patent is:

1. A non-porous form for washing by electro-osmosis a film of rubber deposited thereon from an aqueous dispersion of rubber, comprising an electrically conducting deposition surface, and a passage leading from a selected portion of said surface to the interior of the form.

2. A non-porous form for washing by electro-osmosis a film of rubber deposited thereon from an aqueous dispersion of rubber, comprising an electrically conducting deposition surface, and a series of perforations covering a minor portion of the surface leading from a selected portion of said surface to the interior of the form.

3. A non-porous glove form for washing by electro-osmosis a rubber glove deposited thereon from an aqueous dispersion of rubber, comprising an electrically conducting deposition surface of the desired shape, a base, and a passage leading from the wrist section of the surface of the form to the interior of said base.

4. A non-porous glove form for washing by electro-osmosis a rubber glove deposited thereon from an aqueous dispersion of rubber, comprising an electrically conducting deposition surface of the desired shape, a base, and a series of perforations leading from the wrist section of the surface of the form to the interior of said base.

5. A non-porous glove form for washing by electro-osmosis a rubber glove deposited thereon from an aqueous dispersion of rubber, comprising an electrically conducting deposition surface of the desired shape, a base, a hollow wrist portion within said base, and a series of perforations leading from the wrist section of the surface of the form to said hollow wrist portion.

6. A non-porous form for washing by electro-osmosis a film of rubber deposited thereon from an aqueous dispersion of rubber, comprising an electrically conducting deposition surface of the desired shape, a series of perforations leading from a selected portion of said surface to the interior of said form, and a foraminous material covering said perforations on the surface of said form.

7. A non-porous form for washing by electro-osmosis a film of rubber deposited thereon from an aqueous dispersion of rubber, comprising an electrically conducting deposition surface of the desired shape, a groove in a selected portion of said surface, and a series of perforations leading from said grooved surface to the interior of said form.

8. A non-porous form for washing by electro-osmosis a film of rubber deposited thereon from an aqueous dispersion of rubber, comprising an electrically conducting deposition surface of the desired shape, a groove in a selected portion of said surface, a series of perforations leading from said grooved surface to the interior of said form, and a foraminous material in said grooved portion covering said perforations on the surface of said form.

9. A non-porous form for washing by electro-osmosis a film of rubber deposited thereon from an aqueous dispersion of rubber, comprising an electrically conducting deposition surface of the desired shape, a passage leading from a selected portion of said surface to the interior of said form, and a rubber coagulant covering said passage at the surface of said form.

10. A non-porous form for washing by electro-osmosis a film of rubber deposited thereon from an aqueous dispersion of rubber, comprising an electrically conducting deposition surface of the desired shape, a series of perforations covering a minor portion of the surface leading from a selected portion of said surface to the interior of said form, and a rubber coagulant covering said perforations at the surface of said form.

11. A non-porous form for washing by electro-osmosis a film of rubber deposited thereon from an aqueous dispersion of rubber, comprising an electrically conducting deposition surface of the desired shape, a series of perforations leading from a selected portion of said surface to the interior of said form, a foraminous material covering said perforations on the surface of said form, and a rubber coagulant in said foraminous material.

12. A non-porous form for washing by electro-osmosis a film of rubber deposited thereon from an aqueous dispersion of rubber, comprising a surface of the desired shape composed of metal, a cavity within the form, and a passage leading from a selected portion of said surface to the said cavity.

13. A non-porous form for washing by electro-osmosis a film of rubber deposited thereon from an aqueous dispersion of rubber, comprising a surface of the desired shape composed of metal, a cavity within the form, and a series of perforations covering a minor portion of the surface leading from a selected portion of said surface to said cavity.

14. The process of treating a rubber film deposited on a non-porous form from an aqueous dispersion of rubber to remove non-rubber water soluble constituents from the film without removing the film from the form, comprising immersing the form and film in water containing an electrolyte, providing two electrodes disposed so that the rubber film is interposed therebetween, passing an effectively unidirectional electrical current from one electrode through the electrolyte solution to the other electrode, thereby inducing an electro-osmotic flow of the aqueous phase through the rubber film to the surface of the form to produce a body of wash liquid between the surface of the form and the rubber film, and removing said body of wash liquid from between the surface of the form and the film.

15. The process of treating a rubber film deposited on a non-porous form from an aqueous dispersion of rubber to remove non-rubber water soluble constituents from the film without removing the film from the form, comprising immersing the form and film in water containing an electrolyte, making the form one electrode and providing another electrode in the electrolyte so that the rubber film is interposed therebetween, passing an effectively unidirectional electrical current from one electrode through the electrolyte solution to the other electrode, thereby inducing an electro-osmotic flow of the aqueous phase through the rubber film to the surface of the form to produce a body of wash liquid between the surface of the form and the rubber film, and removing said body of wash liquid from between the surface of the form and the film.

16. The process of treating a rubber film deposited on a non-porous form from an aqueous dispersion of rubber to remove non-rubber water soluble constituents from the layer without removing the film from the form, comprising immersing the form and film in water containing an electrolyte, passing an electrical current through said film making the surface of the form the cathode at which gases are evolved and making the film a membrane for an electro-osmotic washing and inducing an electro-osmotic flow of the aqueous phase through the rubber film to the surface of the form to produce a body of wash water containing non-rubber water-soluble constituents of the rubber film between the surface of the form and said rubber film, allowing said body of wash liquid containing the non-rubber water soluble constituents to rise between the film and the surface of the form under the slight pressure developed by the generation of gases and by the flow of water through the film, and removing said wash liquid from the upper portion between the film and the surface of the form.

CHARLES R. PEAKER.
EARDLEY HAZELL.